United States Patent
Ben Dayan et al.

(10) Patent No.: US 11,609,716 B2
(45) Date of Patent: *Mar. 21, 2023

(54) IMPLEMENTING COHERENCY AND PAGE CACHE SUPPORT FOR A STORAGE SYSTEM SPREAD ACROSS MULTIPLE DATA CENTERS

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd.

( * ) Notice: Subject to any disclaimer, the term of this patent is extended or adjusted under 35 U.S.C. 154(b) by 29 days.

This patent is subject to a terminal disclaimer.

(21) Appl. No.: 17/314,678

(22) Filed: May 7, 2021

(65) Prior Publication Data
US 2021/0263653 A1    Aug. 26, 2021

Related U.S. Application Data

(63) Continuation of application No. 16/274,511, filed on Feb. 13, 2019, now Pat. No. 11,023,178.

(60) Provisional application No. 62/702,387, filed on Jul. 24, 2018.

(51) Int. Cl.
*G06F 3/06* (2006.01)
*H04L 67/1097* (2022.01)

(52) U.S. Cl.
CPC ............ *G06F 3/067* (2013.01); *G06F 3/0619* (2013.01); *G06F 3/0644* (2013.01); *H04L 67/1097* (2013.01)

(58) Field of Classification Search
CPC ... H04L 67/1097; G06F 3/067; G06F 3/0619; G06F 3/0644
See application file for complete search history.

(56) References Cited

U.S. PATENT DOCUMENTS

| | | |
|---|---|---|
| 6,487,636 B1 | 11/2002 | Dolphin et al. |
| 7,447,839 B2 | 11/2008 | Uppala |
| 7,681,072 B1 | 3/2010 | Gibson et al. |
| 7,793,146 B1 | 9/2010 | Gibson et al. |
| 8,645,749 B2 | 2/2014 | Reche |
| 8,768,981 B1 * | 7/2014 | Milne ................... G06F 16/182 707/822 |
| 8,812,450 B1 | 8/2014 | Kesavan et al. |
| 8,918,478 B2 | 12/2014 | Ozzie et al. |
| 9,087,012 B1 | 7/2015 | Hayes et al. |
| 9,122,614 B1 * | 9/2015 | Kesavan ............... G06F 3/0689 |

(Continued)

OTHER PUBLICATIONS

Int'l Search Report and Written Opinion Appln No. PCT/IB2016/001177 dated Dec. 2, 2016.

(Continued)

*Primary Examiner* — Minh Chau Nguyen
(74) *Attorney, Agent, or Firm* — McAndrews Held & Malloy, Ltd.

(57) ABSTRACT

A plurality of computing devices are communicatively coupled to each other via a network, and each of the plurality of computing devices is operably coupled to one or more of a plurality of storage devices. The computing devices may use local caches and storing snapshots in a coherent manner when accessing the plurality of storage devices spread across multiple data centers.

21 Claims, 8 Drawing Sheets

(56) References Cited

U.S. PATENT DOCUMENTS

| | | | |
|---|---|---|---|
| 9,448,887 B1 | 9/2016 | Ben Dayan et al. | |
| 2010/0199042 A1* | 8/2010 | Bates | H04L 9/0625 |
| | | | 711/135 |
| 2010/0199125 A1 | 8/2010 | Reche | |
| 2012/0150819 A1* | 6/2012 | Lindahl | G06F 16/24554 |
| | | | 707/687 |
| 2014/0380330 A1* | 12/2014 | Xiao | G06F 9/5016 |
| | | | 718/104 |
| 2015/0134616 A1* | 5/2015 | Zheng | G06F 11/1464 |
| | | | 707/639 |
| 2015/0205680 A1* | 7/2015 | Kimmel | G06F 11/1417 |
| | | | 707/649 |
| 2015/0355971 A1 | 12/2015 | Becker-Szendy et al. | |
| 2016/0004475 A1* | 1/2016 | Beniyama | G06F 3/0613 |
| | | | 710/74 |
| 2016/0246677 A1 | 8/2016 | Sangamkar et al. | |
| 2017/0315878 A1* | 11/2017 | Purohit | G06F 11/1458 |

OTHER PUBLICATIONS

Int'l Search Report and Written Opinion Appln No. PCT/IB2019/000772 dated Jan. 14, 2020.

* cited by examiner

IMPLEMENTING COHERENCY AND PAGE CACHE SUPPORT FOR A STORAGE SYSTEM SPREAD ACROSS MULTIPLE DATA CENTERS

PRIORITY CLAIM

This application is a continuation of U.S. patent application Ser. No. 16/274,511, filed Feb. 13, 2019, which claims priority to U.S. provisional patent application 62/702,387 titled "IMPLEMENTING COHERENCY AND PAGE CACHE SUPPORT FOR A STORAGE SYSTEM SPREAD ACROSS MULTIPLE DATA CENTERS" filed on Jul. 24, 2018. The above identified applications are all hereby incorporated herein by reference in their entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

U.S. Patent Application No. 62/691,667 titled "Implementing Coherency and Page Cache Support in a Distributed Way for Files" is hereby incorporated herein by reference in its entirety.

BRIEF SUMMARY

Methods and systems are provided for implementing coherency and page cache support for a storage system spread across multiple data centers substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory such as, for example, RAM, for fast access, and may be backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
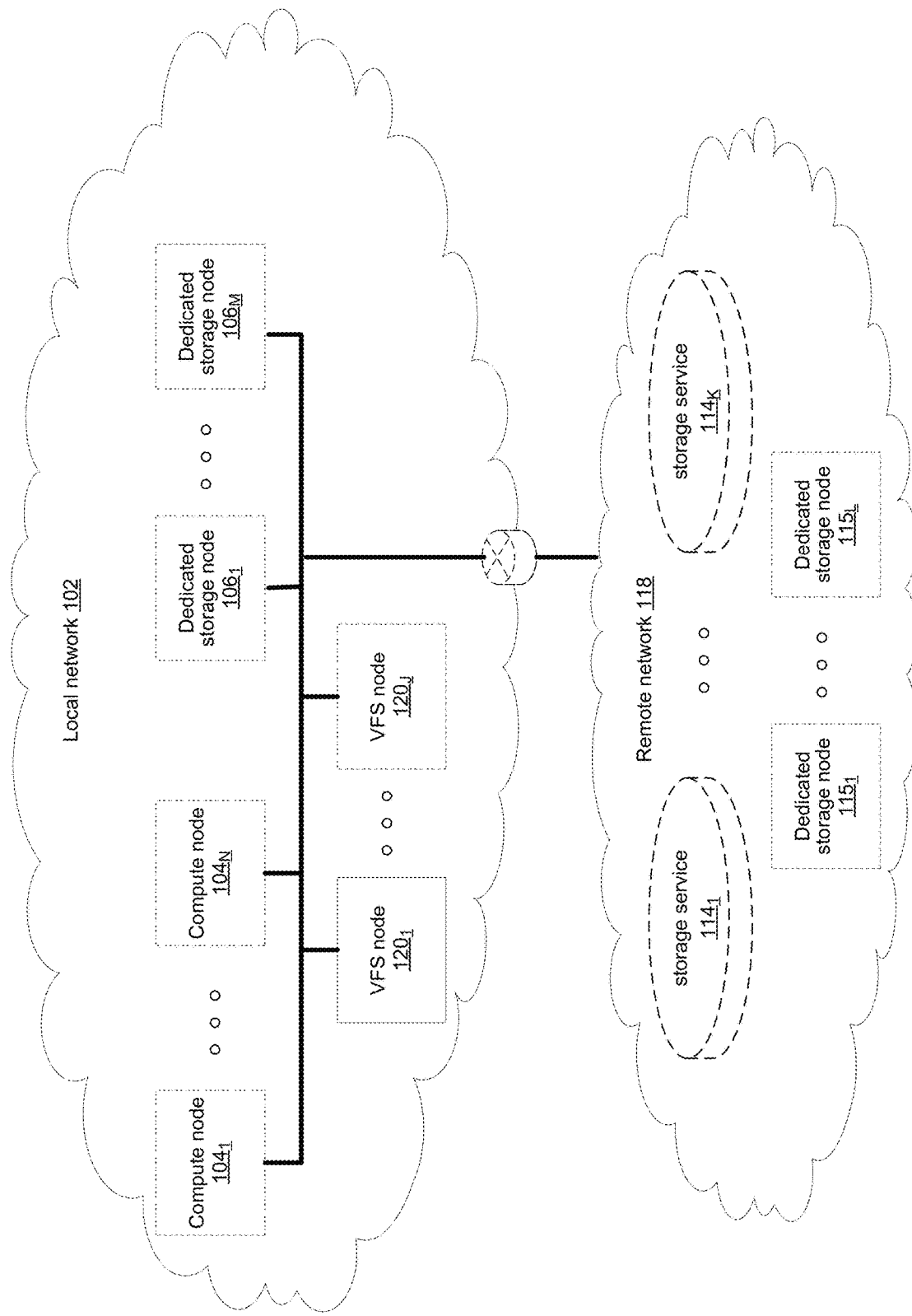
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each VFS node $120_j$ (j an integer, where 1≤j≤J) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
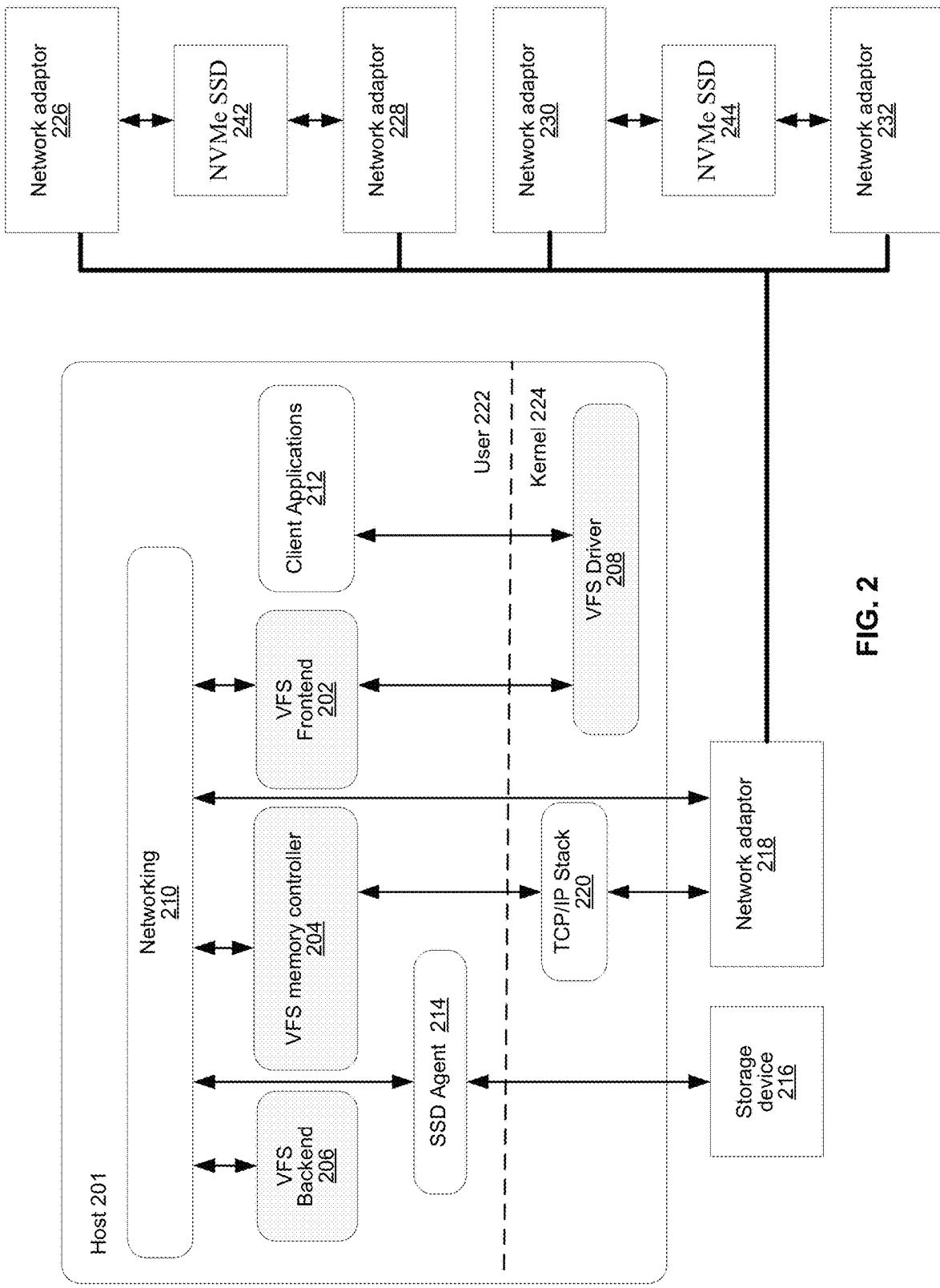
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 216 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD, for example, the non-volatile storage device 216, with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-oF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective non-volatile storage device 216. This may include, for example, translating addresses, and generating the commands that are issued to the storage device (e.g., on a SATA, SAS, PCIe, or other suitable bus). Thus, the VFS SSD agent 214 operates as an intermediary between a non-volatile storage device 216 and the VFS backend 206 of the virtual file system. The SSD agent 214 could also communicate with a standard network storage device supporting a standard protocol such as NVMe-oF (NVMe over Fabrics).

Figure 3:
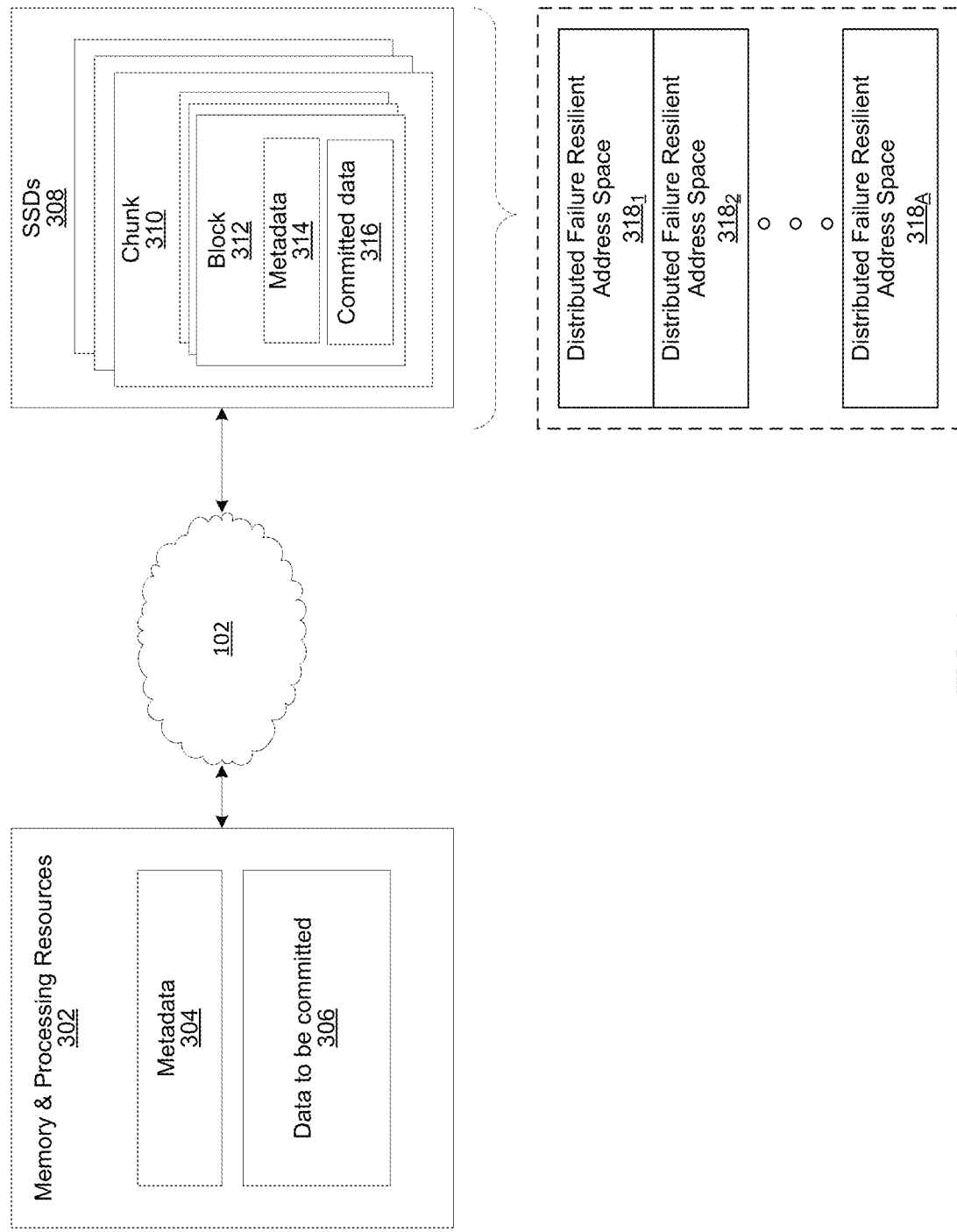
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical non-volatile storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30k servers could chop the metadata space into 128k or 256k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 ( $$\left(\frac{26!}{5! * (26-5)!}\right)$$

) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Because each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 318) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes, and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Figure 4A:
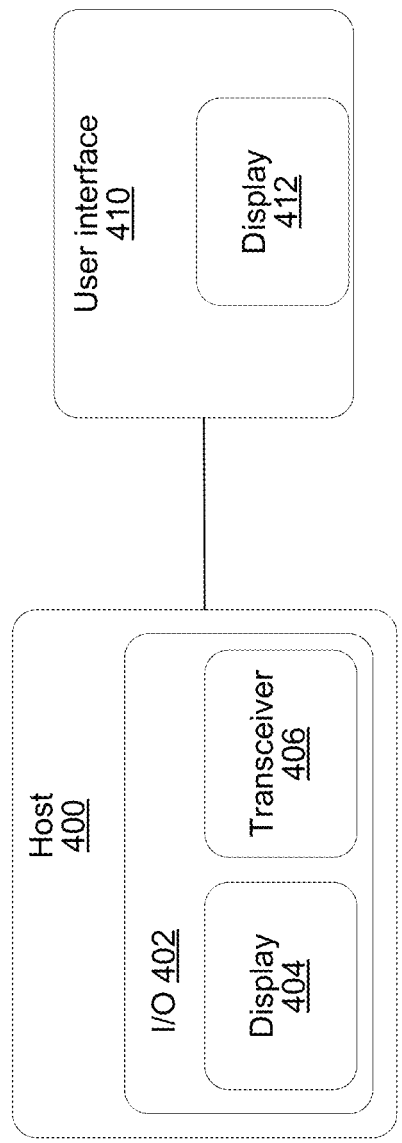
FIG. 4A illustrates a user interface for a storage system in accordance with an example implementation of this disclosure.

FIG. 4A illustrates a user interface for an example host of a storage system in accordance with an example implementation of this disclosure. Referring to FIG. 4A, there is shown a host 400 communicatively coupled, either wired or wirelessly, to the user interface 410. The host 400 may be similar to the host 201. The host 400 may also have, for example, an input/output (I/O) interface 402 that allows communication with the user interface 410. The I/O interface 402 may also comprise one or more input devices such as, for example, a mouse, a trackball, a keyboard, buttons, a touch panel or screen, etc. that allows a user to enter information. The I/O interface 402 may also have one or more output devices such as, for example, lights/LEDs, a speaker, a display, etc. that allows a user to see or hear various outputs. Accordingly, the host 400 may have a display 404. The host 400 may also have, for example, a transceiver 406 that may be suitable for communicating with another electronic device via one or more wired protocols and/or one or more wireless protocols. Wired protocols may be, for example, USB, Firewire, SCSI, etc. Wireless protocols may be, for example, a cellular protocol, WiFi, Bluetooth, NFC (Near Field Communication), etc.

Accordingly, the I/O stack 210, the TCP/IP stack 220, and/or the network adaptor 218 may be thought of as being a part of the I/O interface 402. The I/O interface 402 may be a logical grouping of input/output devices and applicable software.

Various embodiments may also communicate with the user interface 410, which may be similar to the I/O interface 402.

Depending on the application software, the user interface 410 and/or the I/O interface 402 may be used to access information, status, etc. for any level of the storage system. For example, the access may be to a specific node, a file system, the entire storage system, etc. Therefore, for a distributed storage system that may have several clusters, or data centers, there may be a storage system management system that allows overall view and control of the storage system. There may also be a cluster management system that may present a view and control of an individual cluster (data center). There may be other management systems that allow granular control for the cluster. These may comprise, for example, bucket level management system, node level management system, etc. Various embodiments of the disclosure may have these management systems available via the user interface 410 and/or the I/O interface 402. Some embodiments may have some or all management systems available via specific management nodes with its user interface 410 and/or I/O interface 402.

The various management systems may use one or more processors such as those previously described or have their own dedicated processors. For the sake of brevity, the various management systems may be referred to as a "management system." There may be occasions when a local event in one cluster may result in actions from one or more other clusters. For example, a write from a first cluster to a second cluster may result in actions in the second cluster, as well as possibly in other clusters. For ease of description, a high level view describes the actions as being taken by the local cluster rather than actions taken by the local cluster and actions taken by the remote clusters in response to actions by the local cluster. The term "remote" may refer to an entity that is in another cluster (data center). Similarly, actions described as being taken by a local processor may include actions taken by remote processor(s) due to the actions of the local processor.

A storage system may be created such that at any given moment one active cluster (or data center) out of several clusters may control changing data, and the other clusters may have read-only views as inactive clusters. Because there may not be any coordination between the active cluster and the inactive clusters, the read-only view for the inactive clusters may comprise outdated data. To have better access to the data controlled by the active cluster, one method may redirect clients to the active cluster. However, this may result in longer latency.

In some cases, users from the different data centers may want to work on the same file system view without actual sharing of data. The users may also want local access latencies on the data that is accessed locally. In such cases, a "global file system" may be created for running the several clusters.

Figure 4B:
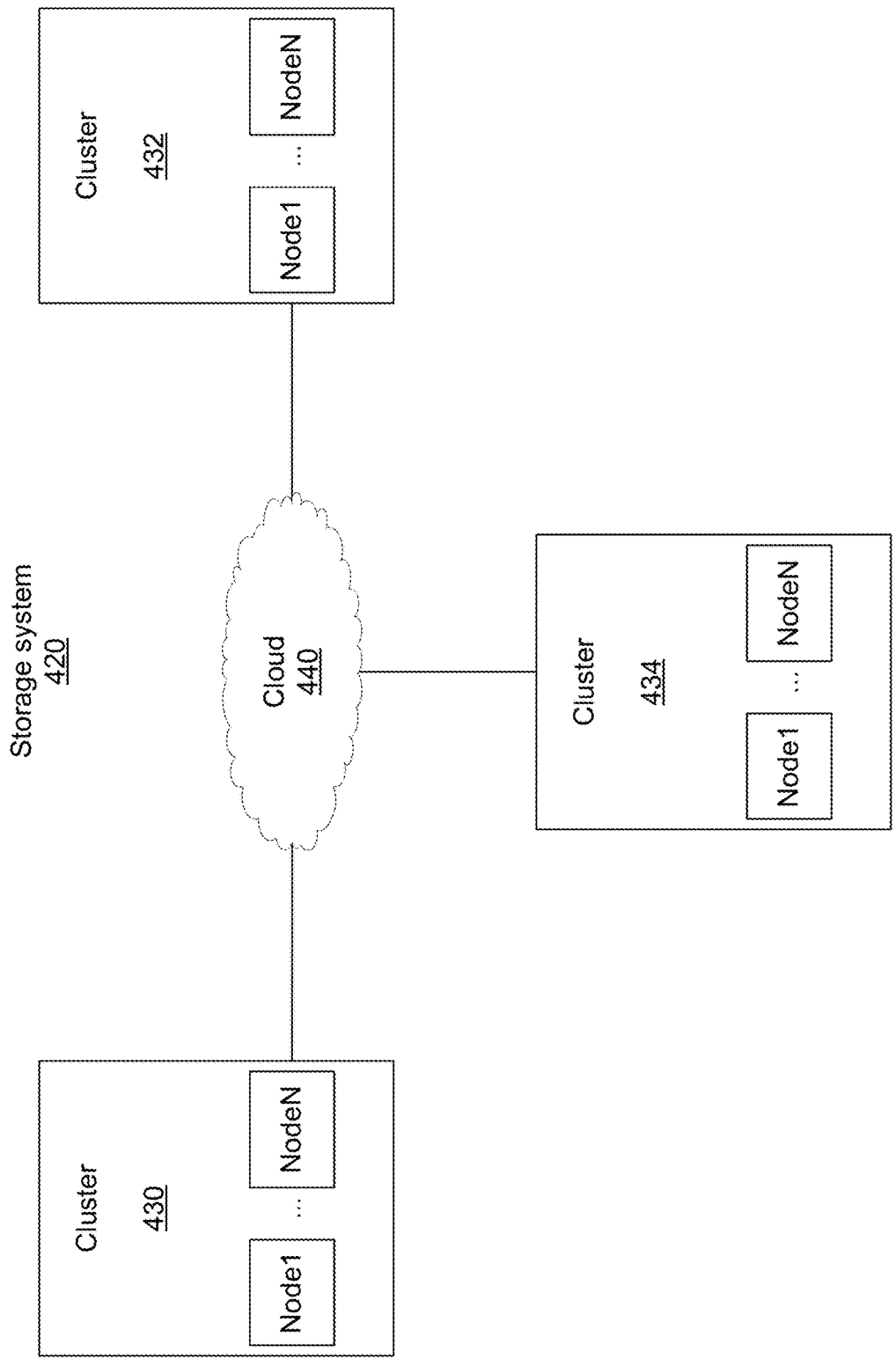
FIG. 4B illustrates a high level block diagram for multiple clusters in a storage system in accordance with an example implementation of this disclosure.

FIG. 4B illustrates a high level block diagram for multiple clusters in a storage system in accordance with an example implementation of this disclosure. Referring to FIG. 4B, there are shown the storage system 420 and the cloud 440. The storage system 420 may comprise three clusters 430, 432, and 434 that may communicate with each other via the cloud 440. The clusters 430, 432, and 434 are shown as each having a plurality of nodes Node1 to NodeN. However, the number of nodes for each cluster need not be the same. The nodes Node1 to NodeN may be any type of nodes shown previously. For example, any one of the Node1 to NodeN may be a compute node 104, a VFS node 120, a storage node 106, 115. Any one of the Node1 to NodeN may also be a dedicated management node.

The cloud 440 may describe a mode of communication from one cluster to another. Accordingly, the cloud 440 may comprise the various devices that may allow two devices to communicate with each other. For example, the cloud 440 may comprise the Internet, cellular system(s), WiFi network(s), etc. that may be used individually or together to allow communication between two or more devices.

There may be various reasons for having multiple clusters of nodes in the storage system 420. An example may be when the clusters are situated approximately 8 hours apart so that development may occur around the clock. Another example may be to separate the clusters geographically to provide additional safety factor for the different, or the same, data that may be in the clusters 430, 432, 434. A global file system may also use multiple clusters.

While three clusters 430, 432, and 444 are shown, an embodiment of the disclosure need not be limited to three clusters. There may be fewer clusters or more clusters in a storage system. Accordingly, any of the clusters 430, 432, or 434 may be a storage system by itself.

While a global FS configuration may be useful in some instances, it may have increased network cost due to the requirement to have low-latency network between the data centers because there may be much more communication on the network to reach a decision about what file will be managed by which cluster. Accordingly, a cheaper way to operate a global FS may be desirable.

The clusters in a global FS may have the same metadata view of the file system, but each cluster may manage its own buckets. Accordingly, the cluster sizes may be different. The IDs of the objects may stay the same so that the same file/directory/etc. may share the same ID for the various clusters. However, due to different number of buckets, the objects may be sharded into different bucket IDs. The discrepancy in the buckets may be due to, for example, physical differences in the clusters of nodes. For example, different nodes may be out of service for the different clusters. Or, within a node, different hardware devices, such as, for example, different storage devices, may be out of service. Furthermore, there may be network outages or power failures, either blackouts or brown-outs, which may affect operation of the various nodes.

However, regardless of the differences in sharding to buckets, each front end (FE) may have a view of all the buckets and SSD agents of all the clusters, with the knowledge of what buckets and SSD agents belong to which cluster. Accordingly, an FE may be able to send an IO request to a remote bucket, or a leasing request. To reduce latency, an FE may cache data for read and/or write operations until the cache needs to be updated by either writing to object storage and/or refreshing the read cache.

Accordingly, optimizations to allow caching in local RAM of the computer may allow faster and more operations locally with no need to access the actual storage system until needed. Depending on a configuration, a "local" RAM may be directly accessible to a computer, or accessed via a local network where the access times to the RAM can be controlled by configuring the local network to acceptable performance. Various embodiments may allow this to happen and still present sharable coherent storage to the end user by implementing, for example, "leases" for files.

A file lease may be, for example, a shared token between a backend, such as, for example, the VFS backend (BE) 206, and a frontend, such as, for example, a VFS frontend (FE) 202. The shared token may signal, for example, that a certain FE is using a certain file. In various embodiments, a lease may be given for an entire file, while other embodiments may give a lease for a portion of a file.

A lease holder may be an FE in a cluster that holds a lease for all the file users that are accessing the system through it. A cluster usage pattern may describe the properties of the group of lease holders, for example, FEs, that own a lease for a given file.

A lease may have associated with it a lease capability that may describe what the lease holder, for example, a FE, can do with the file associated with the lease. For example, the lease capability may give read and/or write permission to the file. There may also be a capability that limits each FE to a certain range of the file. This may be useful, for example, when multiple FEs have leases to the same file. The lease may also denote cache capability. For example, a lease may not allow any caching, or a combination of read and/or write caching.

A more detailed description of a lease, including various scenarios for requesting, renewing, and revoking a lease, is provided by the provisional application 62/691,667, the contents of which are incorporated herein by reference.

Figure 5:
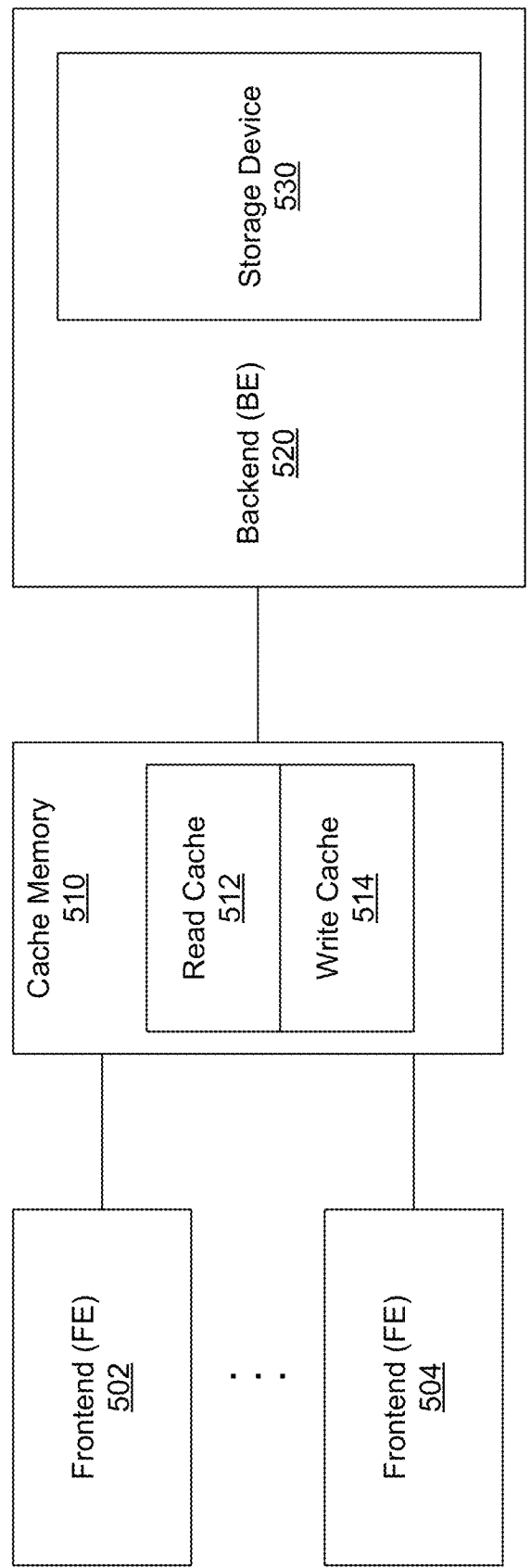
FIG. 5 illustrates a high level block diagram of an example configuration with cache memory in accordance with an example implementation of this disclosure.

FIG. 5 illustrates a high level block diagram of an example configuration with cache memory in accordance with an example implementation of this disclosure. Referring to FIG. 5, there are shown frontends (FEs) 502, 504, cache memory 510, and a backend (BE) 520. The cache memory 510 may be, for example, a RAM (random access memory) such as an SRAM (static RAM) or DRAM (dynamic RAM), or another type of memory that has acceptable read and write times. The specific type of memory used may depend on, for example, access speed needed, cost constraints, etc.

The cache memory 510 may comprise a read cache 512 and a write cache 514. The BE 510 may have associated with it a storage device 530 that may be similar to the storage device 216 or the NVMe SSD 242, 244.

The FEs 502 and 504 may be similar to, for example, the VFS Frontend 202, and the BE 520 may be similar to, for example, the VFS Backend 206. The read cache 512 and the write cache 514 may be local to, for example, both of the FEs 502, 504, or each of the FEs 502 and 504 may have their respective local read cache 512 and local write cache 514. The storage device 530 may be locally attached to, for example, the BE 520 as the storage device 216 is locally attached to the SSD agent 214, or network attached to the FEs 502, 504 and the BE 520 as the NVMe SSD 242, 244 is network attached to the VFS Frontend 202 and the VFS Backend 206.

Prior to performing a memory access to the storage device 530, the FEs 502 and 504 may acquire a lease from the BE 520. However, in a global FS configuration, when opening a file, instead of requesting a lease from the local cluster, a lease may be requested from all known clusters. The lease request may be managed by, for example, a storage system interface that may provide system wide management. The system storage interface may be provided via, for example, the I/O interface 402 or the user interface 410.

Various embodiments of the storage system may allow taking a snapshot by, for example, the FE 502 to save a data set at a particular point in time. The snapshot may comprise, for example, differential information with respect to a previous snapshot or an image. The storage system may allow snapshots at a file system level for a group of data storage devices such as, for example, a bucket level. The snapshots may then be saved to the backend object storage such as, for example, the BE 530 such that the backend object storage stores a complete copy of the file system in a way that it may be read and used from a completely different cluster (data center). Accordingly, the state of the registry may need to be recovered on the new system with all inodes and extents that will store all the structure of the system. The process of saving the snapshot to the backend object storage may be referred to as, for example, snapshot to object storage. The backend object storage may be similar to, for example, the storage device 216, 222, 230, 308, or 530.

When the snapshot data is managed at the bucket level, the snapshot workload may be shared across all buckets. Therefore, each bucket may manage all the snapshots for all its managed objects such as, for example, directories, inodes, file data ranges, etc. A processor, such as, for example, a processor of the host 201 or a processor of the network adaptor 218, or any other processor that may be appropriate as shown on FIGS. 1 and 2, may be used for managing the snapshots, including storing the snapshots to backend object storage, etc. For example, the snapshot management may be performed by the leader of a bucket. The snapshot management may be visible to a user via, for example, the user interface 410 or the I/O interface 402.

Each cluster may have its own "local" object storage backend for tiering, and it may tier individually to that object storage. Since the state of one cluster may be the same as the states of the other clusters, it may not matter to the storage system whether there is just one object storage or several object storages at each cluster, or whether one of the clusters may actually write to a compound object storage.

Each cluster may be able to individually save snapshots to backend object storage since the cluster knows the object storages it manages. The saving process may be referred to as snapshot to object storage.

Figure 6:
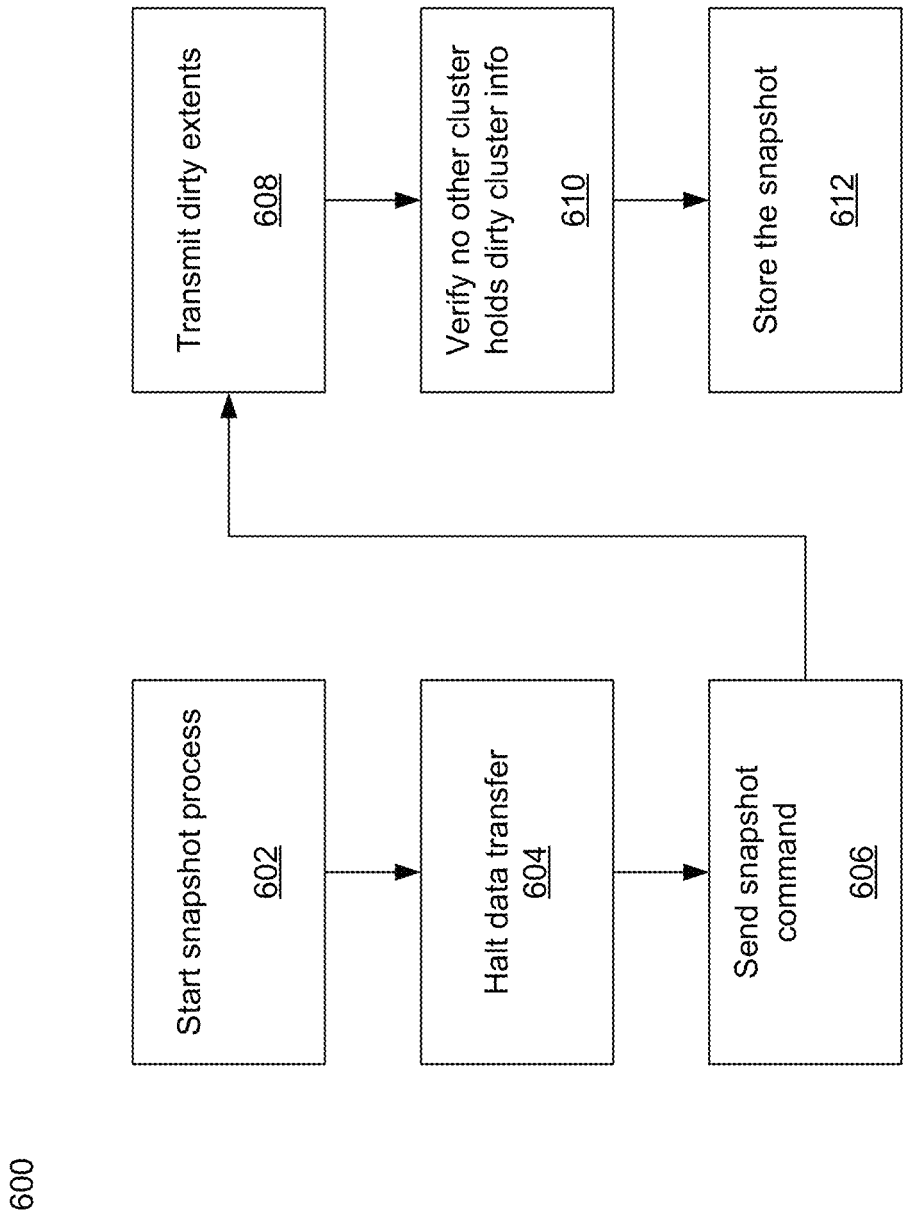
FIG. 6 illustrates an example flow diagram of taking a snapshot in accordance with an example implementation of this disclosure.

FIG. 6 illustrates an example flow diagram of taking a snapshot in accordance with an example implementation of this disclosure. Referring to FIG. 6, there is shown a flow diagram 600 comprising blocks 602 to 612 for snapshots in a global file system.

At block 602, a snapshot may be started. The snapshot may be taken periodically, at certain times, or at the discretion of the user. The snapshot may also be taken as determined by the storage system, or as determined by some subunits of the storage system.

At block 604, IO processes may be stopped across all clusters. At block 606, snapshot commands may be sent to all clusters so that the states of the various clusters may be kept coherent. At block 608, dirty extents may be distributed to the other clusters so that they may have the snapshot information. This may allow all clusters to log changes in other clusters to their local ODHs that log the snapshot operations.

At block 610, before a snapshot to object storage process starts, the clusters may verify that no other remote bucket holds any dirty cluster information that is associated with an extent of such a snapshot. At block 612, when all local extents are up-to-date regarding that snapshot, the snapshot to object storage may be performed.

With regard to the global file system, different behaviors may occur depending on the shared usage of the files. For example, in a first scenario, there may not be conflicting file accesses among the clusters. That is, a lease request may not conflict with an active lease on the remote clusters. Accordingly, the cluster may use the data as if it were the only one accessing it.

In a second scenario, file accesses may be shared across the clusters, but only for reads. Reads may be served locally such that all FEs may have only a read lease for a particular file. In a third scenario, file accesses may be shared for read, but a subset of the files may still be marked dirty, or changed, by one cluster.

In a fourth scenario, file accesses may be shared for write across the different clusters but only one cluster may actively write to a file. The active cluster may be picked by the storage system by considering one or more criteria such as, for example, which cluster opened first, which cluster has more opened files, etc. In some cases, all the dirty extents may be copied to a more optimized cluster and then work may continue. Accordingly, all the FEs from all the clusters may be able to route their reads and writes to the BEs on the correct clusters.

While the fourth scenario may result in IOs being diverted to the other clusters, the IOs are routed automatically so there may not be a need to change anything on the application side. Also, as the accesses to the other clusters are made on a per-file basis as needed, this may provide optimized use of the storage system over several clusters (data centers), where nodes at each cluster may have performance close to local performance.

The storage management system may also provide monitoring information (via CLI, API, GUI, etc.) to show the files that may be under to allow the users to profile its use and, as needed, alter the application in a way that it shares less files across clusters. A file may be under contention when contention writes are requested to it from multiple clusters.

However, when writes occur, the lease mechanism may mark a list of dirty extents, or extents that have changed, that need to be sent to the remote clusters so they have the same view of the data. The extent may be kept in an on-disk hash (ODH). This may be similar to the way ODH is used to keep track of the snapshot data/metadata changes. As a background process, after each file is closed, the cluster management system may go over the extents in these files, and copy them to the other clusters, so they may be read locally if needed.

The files that are marked dirty, which were opened for writes by exclusively one cluster, may be blocked for access until all the extents are copied to the remote clusters.

Figure 7:
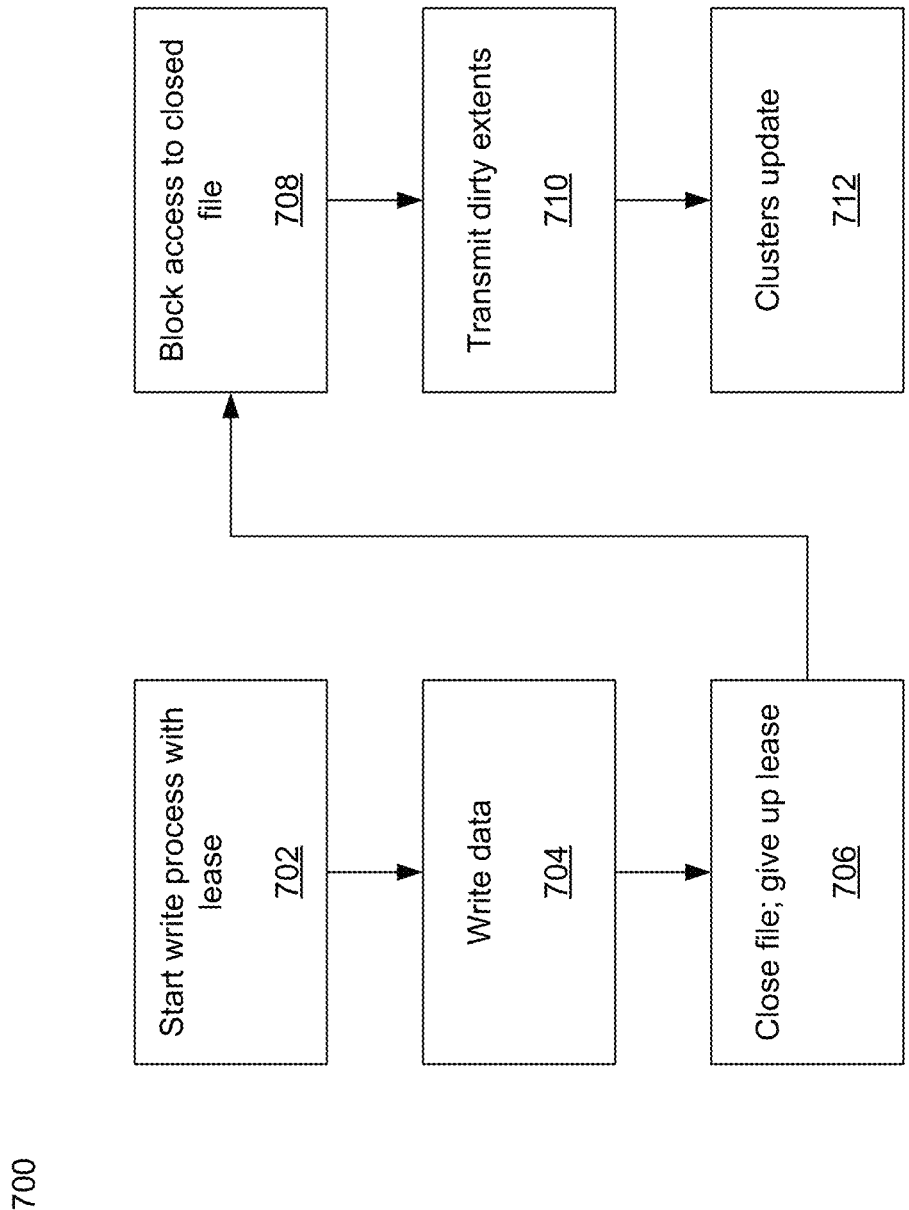
FIG. 7 illustrates an example flow diagram of writing in a global file system in accordance with an example embodiment of this disclosure.

FIG. 7 illustrates an example flow diagram of writing in a global file system in accordance with an example embodiment of this disclosure. Referring to FIG. 7, there is shown a flow diagram 700 with blocks 702 to 712. At block 702, a write process may start with a lease to the appropriate file(s). At block 704, after acquiring the lease, writes may be performed to the file(s). At block 706, the file(s) may be closed because access may not be needed any more, or the present lease holder may need to relinquish the lease due to time multiplexing, request from a higher priority device, etc. At block 708, access to the closed file(s) may be blocked for all clusters. At block 710, dirty extents for the file(s) may be transmitted to all clusters, and at block 712, all clusters may update their extents. Accordingly, all clusters may have accurate information regarding the file(s) in the first cluster that were recently written to by a second cluster.

While FIGS. 6 and 7 described specific flow diagrams, various embodiments may use other flow diagrams without deviating from the disclosure of the various embodiments.

Therefore, it can be seen that an implementation of the disclosure may be a method for using a distributed storage system, where the method comprises managing data in a plurality of clusters, where each of the plurality of clusters comprises buckets, and each of the buckets is distributed across a plurality of storage nodes. The method may also include transferring data to or from each of the buckets using at least one processor of a plurality of processors, where each of the plurality of processors is configured to manage data transfer to or from each of the buckets. Each of the buckets may be distributed across five storage nodes.

The method may also include taking a snapshot by a first processor of the plurality of processors, in a first cluster of the plurality of clusters, of a first bucket of the first cluster of the plurality of clusters. Prior to the first processor taking the snapshot, data transfer to all storage nodes in the plurality of clusters may be halted. Taking a snapshot may then comprise sending a command to take a snapshot to the plurality of clusters. After the snapshot is taken, dirty extents regarding the snapshot may be distributed to the other clusters. The dirty extents may include information regarding the snapshot, and this may be sent to other clusters of the plurality of clusters, where the information can be logged by the other clusters to keep track of the snapshot. The snapshot may be stored by the first processor to one or more storage nodes of the plurality of storage nodes in the first cluster. The one or more storage nodes may be associated with the first bucket, and the first bucket may be managed by the first processor.

Prior to storing the snapshot, the first processor may verify that no other bucket in any of the plurality of clusters holds any dirty cluster information associated with an extent of the snapshot.

The method may also comprise, when writing by a first processor of the plurality of processors in a first cluster to a second cluster in the plurality of clusters, sending extents affected by the write to other clusters of the plurality of clusters to provide a coherent view to all clusters of the plurality of clusters.

The method may comprise, for example, prior to transferring the data to one of the buckets, requesting by a first processor of the plurality of processors, in a first cluster of the plurality of clusters, a lease to open a file in a first bucket of the buckets for at least write privilege for the file. A first processor of the plurality of processors, in a first cluster of the plurality of clusters, may request a lease to open a file in a first bucket of the plurality of buckets. The first processor may additionally request a respective lease from each of the plurality of clusters to open a file in a second cluster of the plurality of clusters.

The method may also comprise relinquishing the lease to close the open file, and transmitting extents associated with the closed file to other clusters of the plurality of clusters. Each of the other clusters may then update their extents with the transmitted extents such that the closed file can be read locally. The transmitting may be done in the background. Access to the closed file may be blocked until the transmitting is done.

When there is a lease request from more than one cluster, a cluster to provide the lease to may be selected based on one or both of: the first lease request and the number of opened files by each of the plurality of clusters Additionally, another implementation of the disclosure may be a distributed storage system comprising a plurality of clusters, where each of the plurality of clusters may comprise buckets, and each of the buckets is distributed across a plurality of storage nodes. The distributed storage system may include a plurality of processors in each of the clusters, where each of the plurality of processors may be configured to manage data transfer to or from each of the buckets. Each of the buckets may be distributed across five storage nodes. A first processor of the plurality of processors, in a first cluster of the plurality of clusters, may be configured to request a lease to transfer data to a first bucket of the plurality of buckets.

A first processor of the plurality of processors, in a first cluster of the plurality of clusters, may be configured to request a lease from each of the plurality of clusters to transfer data from a first bucket in the first cluster to a second bucket in a second cluster of the plurality of clusters.

A first processor of the plurality of processors, in a first cluster of the plurality of clusters, may be configured to take a snapshot of a first bucket of the first cluster. The first processor is configured to store the snapshot to one or more storage nodes of the plurality of storage nodes in the first cluster. The one or more storage nodes may be associated with the first bucket. Prior to the first processor taking the snapshot, data transfer may be halted to all storage nodes in the plurality of clusters.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What are claimed:

1. A distributed storage system (DSS) comprising:
a plurality of storage nodes comprising a plurality of buckets, wherein each bucket is associated with a unique group of storage nodes, and wherein each unique group of storage nodes is dynamically allocated such that no two of the unique groups of storage nodes are the same; and
a plurality of compute nodes, wherein a compute node of the plurality of compute nodes comprises hardware configured to manage data transfer to and/or from the unique group of storage nodes associated with at least one bucket of the plurality of buckets.

2. The DSS of claim 1, wherein the compute node of the plurality of compute nodes is configured to take a snapshot of the at least one bucket of the plurality of buckets.

3. The DSS of claim 2, wherein the compute node is configured to store the snapshot to one or more storage nodes of the plurality of storage nodes.

4. The DSS of claim 3, wherein one or more storage nodes are associated with a particular bucket of the plurality of buckets.

5. The DSS of claim 2, wherein prior to the compute node taking the snapshot, data transfer is halted to all storage nodes.

6. The DSS of claim 2, wherein the compute node is operable to distribute information regarding the snapshot to keep track of the snapshot.

7. The DSS of claim 1, wherein each of the buckets is associated with five storage nodes.

8. The DSS of claim 1, wherein the compute node of the plurality of compute nodes is configured to request a lease to open a file for at least a write privilege for a file.

9. The DSS of claim 1, wherein the compute node of the plurality of compute nodes is configured to request a lease when a file is in a bucket other than the at least one bucket of the plurality of buckets.

10. The DSS of claim 1, wherein the compute node is operable to send extents affected by a write to one or more storage nodes of the plurality of storage nodes to provide a coherent view to all storage nodes of the plurality of storage nodes.

11. A method for using a distributed storage system (DSS), comprising:
managing data in a plurality of buckets, wherein each bucket communicates with a unique group of storage nodes, and wherein no two of the unique groups of storage nodes are the same; and
transferring data to or from each of the buckets using at least one processor of a plurality of processors, wherein each of the plurality of processors is configured to manage data transfer to or from each of the buckets.

12. The method of claim 11, wherein the method comprises taking a snapshot by a first processor of the plurality of processors of a first bucket.

13. The method of claim 12, wherein the method comprises storing the snapshot, by the first processor, to one or more storage nodes of the plurality of storage nodes.

14. The method of claim 13, wherein the one or more storage nodes are associated with the first bucket, and wherein the first bucket is managed by the first processor.

15. The method of claim 13, wherein the method comprises verifying, by the first processor, that no other bucket holds any information associated with an extent of the snapshot, prior to storing the snapshot.

16. The method of claim 12, wherein the method comprises halting data transfer to all storage nodes, prior to the first processor taking the snapshot.

17. The method of claim 12, wherein the method comprises sending a command to take the snapshot, prior to taking the snapshot.

18. The method of claim 12, wherein the method comprises distributing dirty extents, and wherein the dirty extents comprise information regarding the snapshot, and wherein the information can be logged to keep track of the snapshot.

19. The method of claim 11, wherein each unique group of storage nodes comprises five storage nodes.

20. The method of claim 11, wherein the method comprises sending extents affected by a write, when a first processor of the plurality of processors is writing data to a storage node.

21. The method of claim 11, wherein the method comprises requesting, by a first processor of the plurality of processors, a lease to open a file in a first bucket, prior to transferring data to the first bucket.

* * * * *